(12) United States Patent
Mittal et al.

(10) Patent No.: US 10,491,449 B2
(45) Date of Patent: *Nov. 26, 2019

(54) DATACENTER WORKLOAD DEPLOYMENT USING CROSS-FABRIC-INTERCONNECT GLOBAL SERVICE PROFILES AND IDENTIFIERS

(71) Applicant: Cisco Technology, Inc., San Jose, CA (US)

(72) Inventors: Shailesh Mittal, Santa Clara, CA (US); Zhong Chen, San Ramon, CA (US); B. A. Roger Andersson, San Jose, CA (US); Vijayakumar Kothandaraman, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/922,174

(22) Filed: Mar. 15, 2018

(65) Prior Publication Data

US 2018/0205605 A1 Jul. 19, 2018

Related U.S. Application Data

(63) Continuation of application No. 14/502,313, filed on Sep. 30, 2014, now Pat. No. 9,973,380.

(Continued)

(51) Int. Cl.
*H04L 29/08* (2006.01)
*H04L 12/26* (2006.01)
(Continued)

(52) U.S. Cl.
CPC ........ *H04L 29/08171* (2013.01); *H04L 43/06* (2013.01); *H04L 67/1008* (2013.01);
(Continued)

(58) Field of Classification Search
CPC ............... H04L 29/08171; H04L 43/06; H04L 67/1008; H04L 67/30; H04L 41/12; H04L 47/781
See application file for complete search history.

(56) References Cited

U.S. PATENT DOCUMENTS

6,415,322 B1 7/2002 Jaye
6,539,431 B1* 3/2003 Sitaraman ........... H04L 12/2856
709/223

(Continued)

FOREIGN PATENT DOCUMENTS

CN 103078957 A1 5/2013
CN 103248674 A1 8/2013

*Primary Examiner* — Daniel C. Murray
(74) *Attorney, Agent, or Firm* — Edell, Shapiro & Finnan, LLC

(57) ABSTRACT

At least two domains of a datacenter are registered. Each of the domains comprises at least one server. A global pool of identifiers is generated by the global management module. A logical configuration is generated by a global management module. The logical configuration takes the form of a global profile and allows for a workload to be processed at one or more the servers. A global identifier from the global pool of identifiers is associated with the global profile. The global profile is assigned to a server in a first of the at least two domains.

20 Claims, 8 Drawing Sheets

Related U.S. Application Data

(60) Provisional application No. 62/022,733, filed on Jul. 10, 2014.

(51) Int. Cl.
  *H04L 12/911* (2013.01)
  *H04L 12/24* (2006.01)

(52) U.S. Cl.
  CPC .............. *H04L 67/30* (2013.01); *H04L 41/12* (2013.01); *H04L 47/781* (2013.01)

(56) References Cited

U.S. PATENT DOCUMENTS

| | | | |
|---|---|---|---|
| 6,735,691 B1 | 5/2004 | Capps et al. | |
| 6,810,452 B1 * | 10/2004 | James | H04L 12/2803 710/104 |
| 6,842,906 B1 | 1/2005 | Bowman-Amuah | |
| 7,165,122 B1 * | 1/2007 | Sitaraman | H04L 61/2061 709/213 |
| 7,558,863 B1 * | 7/2009 | Sitaraman | H04L 12/2856 709/228 |
| 7,818,454 B2 | 10/2010 | Kim et al. | |
| 8,031,634 B1 | 10/2011 | Artzi et al. | |
| 8,037,187 B2 | 10/2011 | Dawson et al. | |
| 8,117,344 B2 | 2/2012 | Mendez et al. | |
| 8,179,793 B2 | 5/2012 | Brocke et al. | |
| 8,429,258 B2 | 4/2013 | Jennings et al. | |
| 8,447,846 B2 | 5/2013 | Jennings et al. | |
| 8,452,862 B2 | 5/2013 | Neuse et al. | |
| 8,761,762 B2 | 6/2014 | Moermans et al. | |
| 8,762,538 B2 * | 6/2014 | Dutta | G06F 9/5066 709/223 |
| 8,819,282 B2 | 8/2014 | Hegde et al. | |
| 8,984,101 B1 | 3/2015 | Viswanath et al. | |
| 9,134,921 B1 | 9/2015 | Li et al. | |
| 9,141,435 B2 | 9/2015 | Wein | |
| 9,225,772 B2 * | 12/2015 | Lui | H04L 67/10 |
| 9,276,814 B2 | 3/2016 | Michele et al. | |
| 9,451,045 B2 | 9/2016 | Newton et al. | |
| 9,477,506 B2 | 10/2016 | Wang et al. | |
| 9,537,728 B2 | 1/2017 | Chin et al. | |
| 9,544,293 B2 | 1/2017 | Mathew et al. | |
| 9,596,148 B2 | 3/2017 | Chin et al. | |
| 9,600,264 B2 | 3/2017 | Draper et al. | |
| 9,712,455 B1 | 7/2017 | Mittal et al. | |
| 2002/0023159 A1 | 2/2002 | Vange et al. | |
| 2002/0173984 A1 | 11/2002 | Robertson et al. | |
| 2002/0174191 A1 | 11/2002 | Robertson et al. | |
| 2002/0178026 A1 | 11/2002 | Robertson et al. | |
| 2002/0198734 A1 | 12/2002 | Greene et al. | |
| 2002/0199004 A1 | 12/2002 | Jaye | |
| 2003/0004744 A1 | 1/2003 | Greene et al. | |
| 2003/0195962 A1 * | 10/2003 | Kikuchi | H04L 29/06 709/226 |
| 2004/0122832 A1 * | 6/2004 | Heil | G06F 11/1464 |
| 2004/0226017 A1 | 11/2004 | Leonard et al. | |
| 2005/0021747 A1 | 1/2005 | Jave | |
| 2005/0053060 A1 | 3/2005 | Pettey | |
| 2005/0268137 A1 | 12/2005 | Pettey | |
| 2006/0106938 A1 * | 5/2006 | Dini | G06F 11/008 709/228 |
| 2006/0167672 A1 | 7/2006 | Goldman et al. | |
| 2007/0253431 A1 | 11/2007 | Park et al. | |
| 2008/0263633 A1 * | 10/2008 | Banga | G06Q 30/02 726/3 |
| 2009/0007108 A1 | 1/2009 | Hanebutte | |
| 2010/0014540 A1 | 1/2010 | Brocke et al. | |
| 2010/0274910 A1 | 10/2010 | Ghanaie-Sichanie et al. | |
| 2011/0016468 A1 | 1/2011 | Singh et al. | |
| 2011/0131327 A1 | 6/2011 | Bair et al. | |
| 2011/0145413 A1 | 6/2011 | Dawson et al. | |
| 2011/0213859 A1 | 9/2011 | Greene et al. | |
| 2011/0246669 A1 | 10/2011 | Kanada et al. | |
| 2011/0258454 A1 | 10/2011 | Qiu et al. | |
| 2012/0036179 A1 | 2/2012 | Hegde et al. | |
| 2012/0036241 A1 | 2/2012 | Jennings et al. | |
| 2012/0198095 A1 | 8/2012 | Jennings et al. | |
| 2012/0226866 A1 * | 9/2012 | Bozek | G06F 9/45558 711/122 |
| 2012/0254860 A1 * | 10/2012 | Bozek | G06F 9/461 718/1 |
| 2012/0302233 A1 | 11/2012 | Moermans et al. | |
| 2013/0034015 A1 | 2/2013 | Jaiswal et al. | |
| 2013/0034021 A1 | 2/2013 | Jaiswal et al. | |
| 2013/0159473 A1 | 6/2013 | Newton et al. | |
| 2013/0227095 A1 | 8/2013 | Nichele et al. | |
| 2013/0246569 A1 | 9/2013 | Shen et al. | |
| 2013/0339947 A1 | 12/2013 | Neary et al. | |
| 2014/0032753 A1 * | 1/2014 | Watanabe | H04L 29/08549 709/224 |
| 2014/0068045 A1 | 3/2014 | Tarui et al. | |
| 2014/0179271 A1 | 6/2014 | Guccione et al. | |
| 2014/0223013 A1 | 8/2014 | Gaglianello et al. | |
| 2014/0229944 A1 | 8/2014 | Wang et al. | |
| 2014/0351396 A1 | 11/2014 | Stabile et al. | |
| 2015/0009835 A1 | 1/2015 | Koponen et al. | |
| 2015/0052510 A1 | 2/2015 | Draper et al. | |
| 2015/0088586 A1 | 3/2015 | Pavlas et al. | |
| 2015/0089604 A1 | 3/2015 | Mathew | |
| 2015/0096011 A1 | 4/2015 | Watt | |
| 2015/0149632 A1 | 5/2015 | Chin et al. | |
| 2015/0309818 A1 | 10/2015 | Lee et al. | |
| 2015/0372938 A1 | 12/2015 | Patel et al. | |
| 2016/0117113 A1 | 4/2016 | Li et al. | |
| 2016/0156506 A1 | 6/2016 | Nichele et al. | |
| 2016/0196432 A1 | 7/2016 | Main et al. | |
| 2016/0373301 A1 * | 12/2016 | Sakata | G06F 8/60 |
| 2016/0380815 A1 | 12/2016 | Agarwal et al. | |
| 2016/0380891 A1 | 12/2016 | Agarwal et al. | |
| 2017/0005987 A1 | 1/2017 | Masurekar et al. | |
| 2017/0085556 A1 | 3/2017 | Mathew | |
| 2017/0149876 A1 | 5/2017 | Chin et al. | |

* cited by examiner

DATACENTER WORKLOAD DEPLOYMENT USING CROSS-FABRIC-INTERCONNECT GLOBAL SERVICE PROFILES AND IDENTIFIERS

CROSS-REFERENCE TO RELATED APPLICATIONS

This application is a continuation of U.S. patent application Ser. No. 14/502,313, filed on Sep. 30, 2014, which in turn claims priority to U.S. Provisional Application No. 62/022,733, filed Jul. 10, 2014, the entirety of both of which are incorporated herein by reference.

TECHNICAL FIELD

The present disclosure relates to datacenter management, and in particular, workload deployment across one or more domains in a datacenter.

BACKGROUND

A datacenter is a facility used to house computer systems and associated components to provide data processing systems (e.g., telecommunications system) and storage systems. A datacenter generally includes redundant or backup power supplies, redundant data communications connections, environmental controls (e.g., air conditioning, fire suppression) and various security devices. Organizations have begun building very large facilities to provide businesses with a range of solutions for system deployment and operation. Accordingly, datacenters can occupy one room of a building, one or more floors, an entire building, or be distributed throughout multiple buildings and geographic locations. Most of the equipment forming a datacenter is in the form of servers mounted in rack cabinets, which are usually placed in single rows forming corridors (so-called aisles) between them.

Data centers are arranged in a hierarchical structure which includes servers which are grouped together into chassis. Chassis are grouped into domains. A fabric interconnect is used to facilitate communication between the servers within a domain, and a domain level management module provides management of workloads at the domain level. Multiple domains are then grouped to form a datacenter.

DESCRIPTION OF EXAMPLE EMBODIMENTS

Overview

Presented herein are techniques for managing a datacenter. At least two domains are registered. Each of the domains comprises at least one server. A global pool of identifiers is generated by the global management module. A logical configuration is generated by a global management module. The logical configuration takes the form of a global profile and allows for a workload to be processed at one or more the servers. A global identifier from the global pool of identifiers is associated with the global profile. The global profile is assigned to a server in a first of the at least two domains.

EXAMPLE EMBODIMENTS

Figure 1:
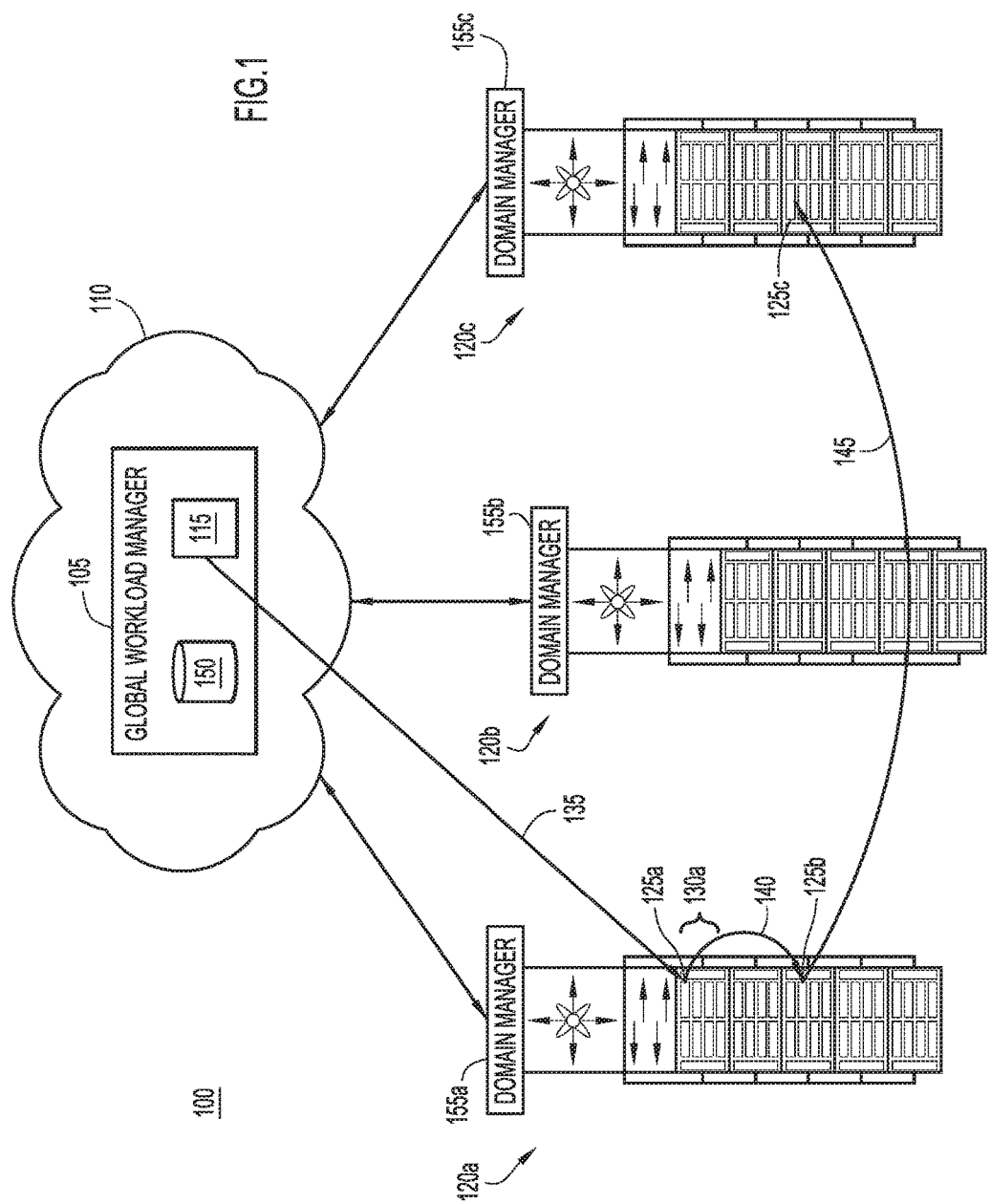
FIG. 1 shows a datacenter configured to provide logical workload deployment across domains from a cloud-based global management module, according to an example embodiment.

Depicted in FIG. 1 is a network environment configured to perform logical workload deployment across domains of a data center from a cloud based workload manager. Specifically, global workload manager 105 resides in cloud 110. Global workload manager 105 generates global profiles 115, which can then be migrated to servers contained within data center domains 120a-c. Global profile 115 will define a workload for one or more servers, and by assigning global profile 115 to a server, that server will process the workload defined by global profile 115. Accordingly, when global workload manager 105 assigns global profile 115 to server 125a arranged within chassis 130a, server 125a will receive and process tasks associated with the workload defined by global profile 115. In order to facilitate this assignment of global profile 115, the servers in domains 120a-c register with global workload manager 105. This registration provides global workload manager 105 with an understanding of the hardware resources available in the servers of domains 120a-c.

The workload defined by global profile may comprise, for example, a storage workload. A global profile may also define a basic input-output system (BIOS) policy, and all the domain specific resources (for example external management IP including access KVM over the network).

When global profile 115 is assigned to server 125a, pre-validation of the configuration can take place in the cloud-based management system. Specifically, pre-validation of the identifiers can be performed in the cloud based management system prior to assigning the global profile 115 to server 125a as the global workload manager 105 tracks and ensures the uniqueness of the identifiers in the global pool of identifiers.

If it is determined that server 125a should no longer handle the workload associated with global profile 115, for example, if server 125a crashes, the workload associated with global profile 115 can be reassigned to another server, regardless of whether or not the new server is located within the same domain as server 125b. For example, if server 125a crashes, its workload can be reassigned to server 125b, as schematically illustrated by 140. Furthermore, the workload associated with global profile 115 can be reassigned across domains. For example, if all of domain 120a crashes, or server 125b crashes and there are no other servers within domain 120a capable of handling the workload associated with global profile 115, global profile 115 can be assigned to another server within another domain. Specifically, global profile 115 may be reassigned from server 125b in domain 120a to server 125c in domain 120c, as schematically illustrated by 145.

In order to facilitate this cross-domain reassignment of global profile 115, global workload manager 105 generates global identifier pool 150. Global identifier pool 150 contains identifiers, such as network addresses, which are reserved by global workload manager 105. Once an identifier from global identifier pool 150 is assigned to global profile 115, no other global profile can use the already assigned identifier. Because global workload manager 105 is located within cloud 110, it has visibility to each of domains 120a-c. This allows global workload manager 105 to ensure that a first domain, such as domain 120a, does not assign the same identifier (e.g. address) that a second domain, such as domain 120c, has already assigned to one of its servers. When the assignment of identifiers is determined at the domain level by, for example, domain managers 155a-c, the domain managers lack the visibility to ensure that identifiers remain unique between different domains. Accordingly, if a workload were migrated from domain 120a to domain 120c, the migration may result in two servers in domain 120c being assigned duplicate identifiers, thereby causing network errors.

Through the use of the techniques described above, data center administrators are provided with a fast, efficient and effective method for planning and carrying out workload deployments. The administrators can provide the deployments without having to worry about the physical binding of the workload to the managed-endpoint (e.g., server). By eliminating domain managers from the deployment process, administrators can concentrate on defining the workloads, without having to perform manual book-keeping of identifiers, and without having to track resource availabilities across domains. Furthermore, the techniques described herein ensure the availability of services even when the element manager is down.

Figure 2:
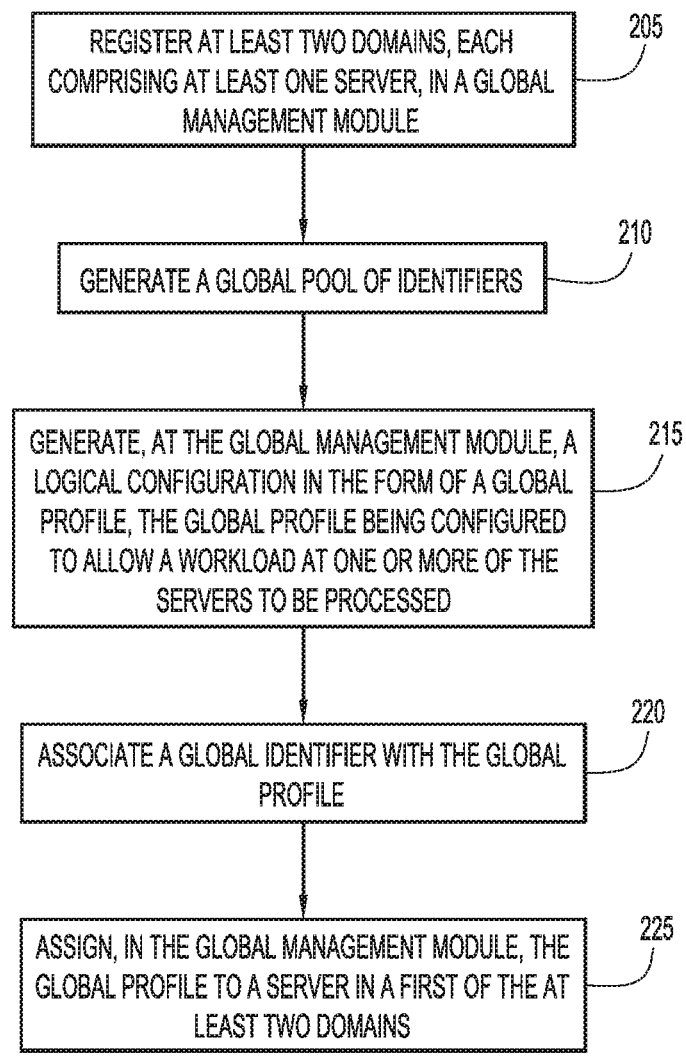
FIG. 2 is a flowchart illustrating a process for providing logical workload deployment across domains from the cloud, according to an example embodiment.

With reference now made to FIG. 2, depicted therein is flowchart 200 illustrating an example process for providing logical workload deployment across domains. The process begins in 205 where two domains, with each domain comprising at least one server, are registered in a global management module, such as global workload manager 105 of FIG. 1. This registration may take the form of communications between a global management module, such as global workload manager 105 of FIG. 1, and a domain manager, such as domain managers 155a-c of FIG. 1. According to other examples, individual servers will directly register with the global management module. Once registered, the servers may be placed in global pools of resources, in this case, a global pool of servers. These pools may be based on "common denominators," such as minimum requirements necessary to handle certain workloads, or other features of the servers, which allow them to be commonly grouped and/or allow a specific workload to be assigned to anyone of the servers in the pool.

In 210, a global pool of identifiers is created. The identifiers within the global pool of identifiers will serve as the identifiers that will be distributed between the servers of the at least two domains referred to in 205. In other words, a global pool of identifiers serves as a pool of possible identifiers, such as network addresses, from which a plurality of domains will draw identifiers for their servers. Because a single pool is used for multiple domains, unique addresses across the domains can be ensured. By generating a global pool of identifiers to be used across domains, the global management module can ensure that the same identifier is not used in two separate domains. For example, once an identifier is assigned to a server (as will be described in conjunction with reference numerals 215-225), a global management module can ensure that no other server receives the same identifier, regardless of the domain in which the server is located. Also, while 210 is illustrated after 205, the generation of the global pool of identifiers can takes place prior to or contemporaneously with the registration of the at least two domains.

The global pools of identifiers may include pools of media access control (MAC) addresses, world wide node name (WWNN) identifiers, world wide port name (WWPN) identifiers, boot logical unit numbers (LUNs), and others. Furthermore, internet protocol addresses and ranges of addresses can be included in, and assigned from, global pools of identifiers.

In 215, a logical configuration in the form of a global profile is generated at the global management module. The global profile allows for a workload to be processed at one server. Specifically, the global profile can determine local area network (LAN) connectivity policies, virtual LAN (VLAN) policies, boot policies, BIOS policies, virtual storage area network (VSAN) policies, local disk policies, Serial over LAN (SOL) policies, network control policies, quality of service (QoS) policies, statistics threshold policies, multicast policies, intelligent platform management interface (IPMI) authentication policies, internet small computer system interface (iScsi) authentication policies and others.

In 220, a global identifier from the global pool of identifiers is assigned to the global profile. By associating the global identifier with the global profile, the global management module ensures that whichever device ultimately carries out the workload defined by the global profile has identifiers which are unique across all of the domains and servers which are registered with the global management module. By utilizing identifiers from the global pool of identifiers, the global management module can ensure that address conflicts do not appear for servers located within different domains. Furthermore, if it becomes necessary to migrate the workload from one server to another, regardless of whether the migration takes place across two different domains, the global identifier assigned to the global profile allows for the migration to take place without further bookkeeping by an administrator.

In 225 the global management profile assigns the global profile to a server in a first of the at least two domains registered in the global profile management module. The assignment of the global profile to a server may comprise assigning the global profile to the global pool of servers generated to handle workloads of the type defined by the global profile. The global pool of servers may draw servers from any domain registered in the global management module. For example, a global pool of servers may have been generated which is comprised of servers capable of handling a specific type of storage workload, regardless of which domain the server is located within. The global profile may be of the same specific type of storage workload. Accordingly, the assignment of the global profile to the server may comprise assigning the profile to the resource pool, as any server within the pool is capable of handling the workload defined by the profile. Similarly, the profile can be seamlessly migrated to another server simply by selecting another server within the global pool of resources. Other global pools of resources may include pools of VLANS, pools of VSANS, and pools of Volumes.

Figure 3:
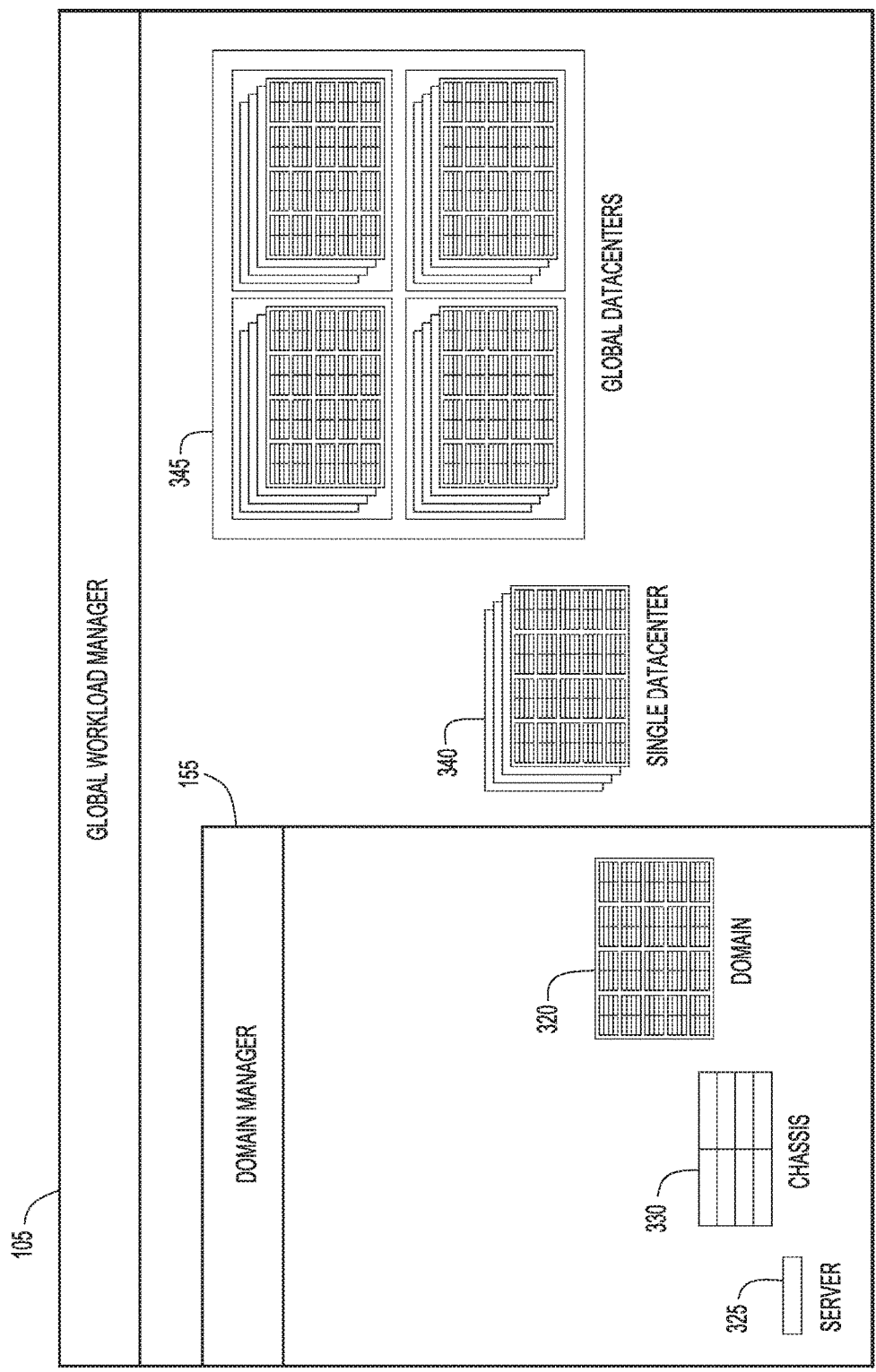
FIG. 3 is an illustration of the management hierarchy of a system employing a global management module for logical workload deployment across domains from the cloud, according to an example embodiment.

With reference now made to FIG. 3, depicted therein is a schematic representation of the hierarchical structure of a global datacenter, and the level of management and visibility that a global management module, as described herein, has over global datacenter workload management. As illustrated in FIG. 3, domain 320 is comprised of 128 servers 325 which are arranged in 16 chassis 330. Domain manager 155 has visibility for a single domain 320, allowing it to manage the 128 servers within a single domain. When multiple domains are combined to form datacenter 340, no single domain manager 155 has visibility of all the domains within the datacenter. Accordingly, there is no domain manager capable managing every server within the datacenter 340. In order to ensure that there are no conflicts between the servers in the datacenter, an administrator may need to provide bookkeeping outside of the services provided by domain managers 155. For example, an administrator may need to keep a spreadsheet of media access control MAC addresses for all of the servers in data center 340 to ensure that duplicates are not used between domains. Additionally, when services or workloads need to be moved from a server in a first domain to a server in a second domain, domain manager 155 cannot easily accomplish the migration. Specifically, domain manager 155 only has visibility of a single domain. Accordingly, an administrator may need to redefine the workload for the new domain, and might not be able to simply migrate the workload from the first domain to the new domain.

Global workload manger 105, on the other hand, has visibility that crosses domains. Accordingly, global workload manager 105 has visibility to an entire datacenter 340, or even a global datacenter 345 comprised of multiple datacenters located at diverse locations. Leveraging this cross-domain visibility, global workload manager 105 can ensure through the use of global pools of identifiers that conflicts, such as address conflicts, do not arise within datacenters 340 or global datacenters 345. Furthermore, a workload defined by global workload manager 105 can be easily migrated across domains without having to redefine the workload at each new domain. While global workload manager 105 provides benefits to datacenters which include multiple domains, a global workload manager as described herein may also be used in datacenter environments comprised of only a single domain.

Figure 4:
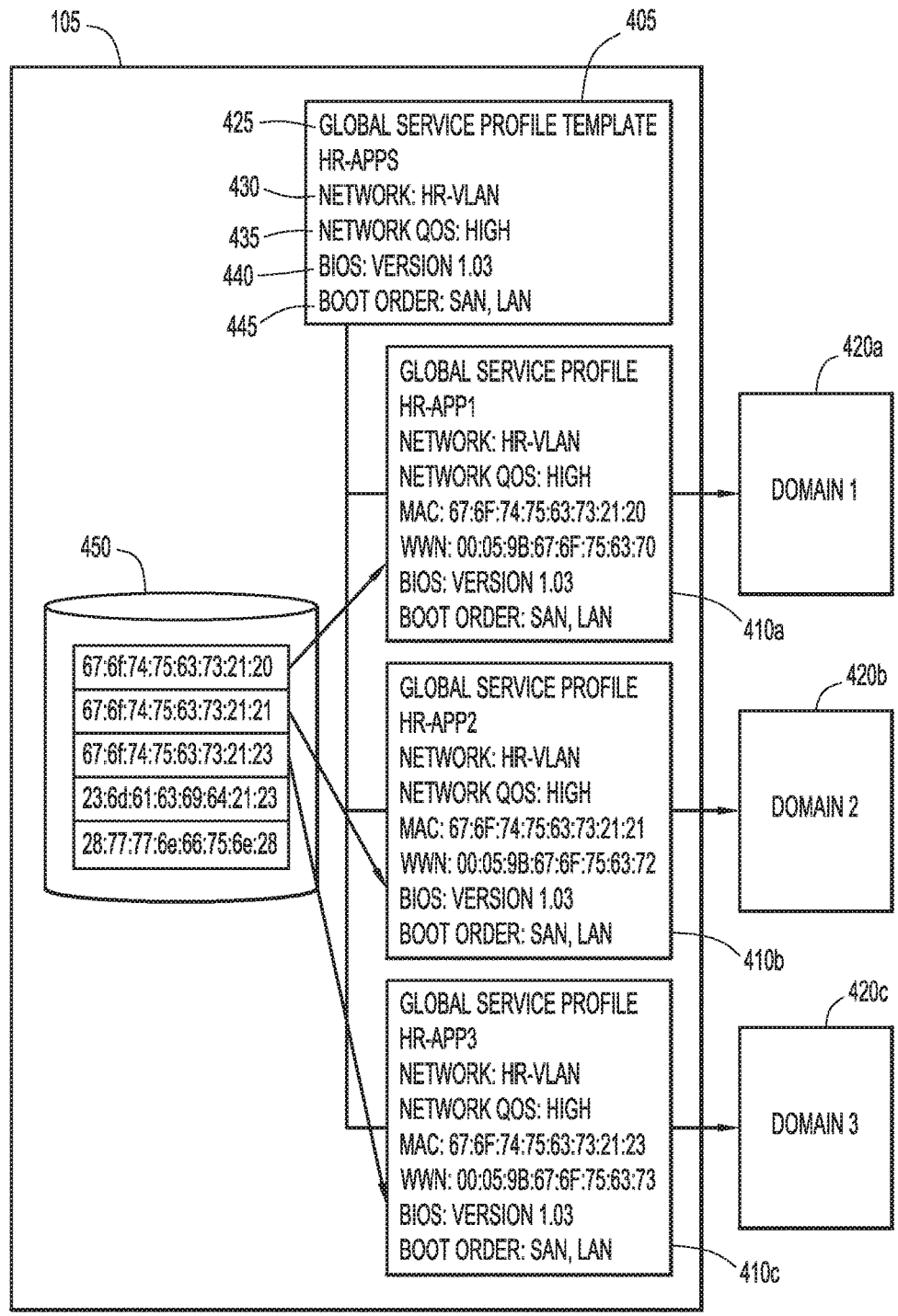
FIG. 4 is a block diagram illustrating an example process for deploying global profiles in order to provide logical workload deployment across domains of a datacenter, according to an example embodiment.

With reference now made to FIG. 4, depicted therein is an example global template 405 and a plurality of global profiles 410a-c for assignment to servers in domains 420a-c, respectively. Specifically, global template 405 is a template for human resources applications (HR-Apps) that will be run in different domains in the datacenter. Global template 405 defines the global polices that can apply across servers, chassis, and/or domains. For example, global template defines the network on which a global profile based on the template will be placed, in this case, the "HR-VLAN" network. Global template 405 also defines a quality of service for the template, in this case, a "High" quality of service. Global template 405 also defines the "Bios Version" and the "Boot Order" as "Version 1.03" and "SAN, LAN," respectively.

Global profiles 410a-c, on the other hand, define the policies that will be specific to the workload and server to which the global profile will be assigned. For example, global profiles 410a-c have all had a specific MAC address and world wide name (WWN) associated with them. These values will be assigned to global profiles 410a-c from the global pools of identifiers generated by the global management module. As illustrated in FIG. 4, global pool of identifiers 450 includes MAC addresses. Each of global profiles 410a-c receives a MAC address from pool 450. Once these three addresses are assigned to profiles 410a-c, the addresses will not be assigned to any other profiles. Accordingly, the servers, which receive global profiles 410a-c, will have unique addresses regardless of which domain the servers reside in. The association between the global profiles and the identifiers from the global pools of identifiers can be done manually or automatically.

Once the global profiles 410a-c are generated, they will be assigned to servers within domains 420a-c. The servers in domains 420a-c to which the global profiles will be assigned may be drawn from global pools of servers, which have been generated by the global management module. For example, a global management module may determine that a specific set of servers have the necessary hardware to process a certain group of workloads. The servers may then be placed in a global pool of resources, in this case a global pool of servers (global because the servers in the pool may be drawn from more than one domain). When a global profile is to be assigned to a server within a domain, the assignment may be performed manually or automatically. Similarly, when services are to be migrated from one server to another, the migration may take place manually or automatically. For example, if a global profile is assigned to a first server which crashes, experiences a performance drop, requires scheduled or unscheduled maintenance, or otherwise should no longer process the workload associated with the global profile, an administrator may manually reassign the global profile to another server using the global management module. According to other examples, when a global profile is to be reassigned, the global management module may automatically select a new server, possibly from a global server pool, to receive the migrated global profile. The global management module may then automatically reassign the global management profile to the new server without intervention from a user, thereby migrating the services defined by the global service profile automatically.

Figure 5:
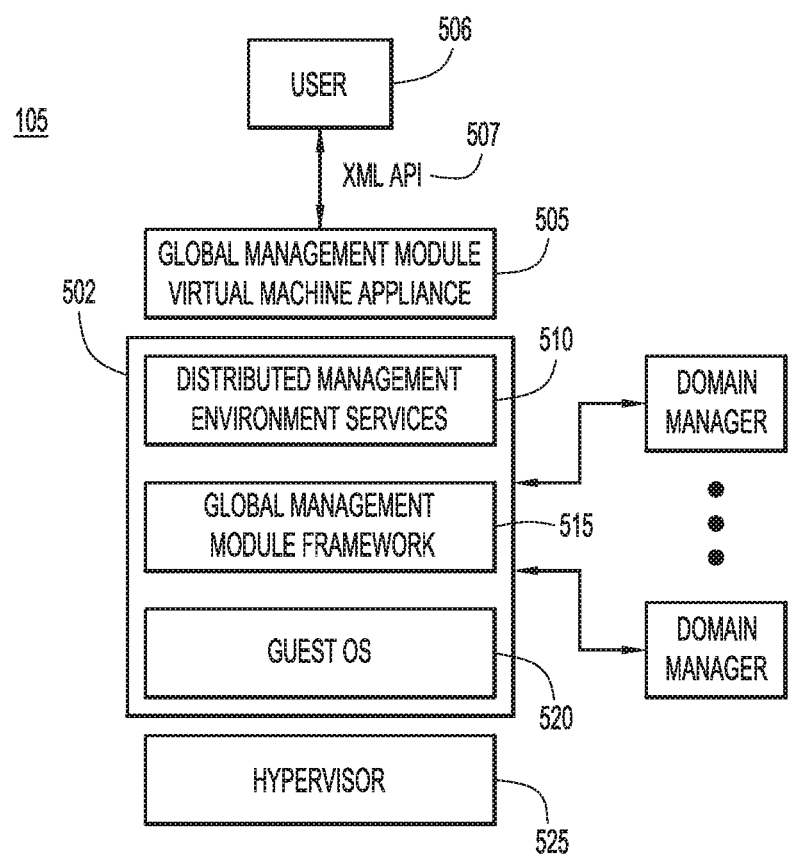
FIG. 5 is block diagram of the architecture of a global management module configured to operate in the cloud, and provide logical workload deployment across the domains of a datacenter, according to an example embodiment.

With reference now made to FIG. 5, depicted therein is a diagram illustrating an example architecture for a global management module, such as global workload manager 105 of FIG. 1. The global management module 105 resides in a virtual machine 502 which runs on virtual machine appliance 505. A user 506 may interact with the virtual machine through an application programming interface (API) 507. The logical framework for the global management module (which may be embodied in either hardware or software) includes distributed management environment (DME) services 510, global management module framework 515, and guest operating system 520. These pieces of the global management module run in a hypervisor virtual machine monitor 525, such as Vmware™ or Windows Server Hyper-V™.

DME 510 is a set of application services which provide system management functions, and provides a framework within which application can be run in order to manage a diverse set of systems. In the present example, DME 510 provides the frame work within which the global management module framework 515 operates. Global management module framework 515 comprises the functionality necessary to carry out the processes described above with reference to FIGS. 1-4. Guest operating system 520 is the operating system for the virtual machine in which the distributed management environment 510 and global management module framework operate. The use of "guest" in the name of operating system 520 refers to the fact that the guest operating system operates within the virtual machine 502.

Figure 6:
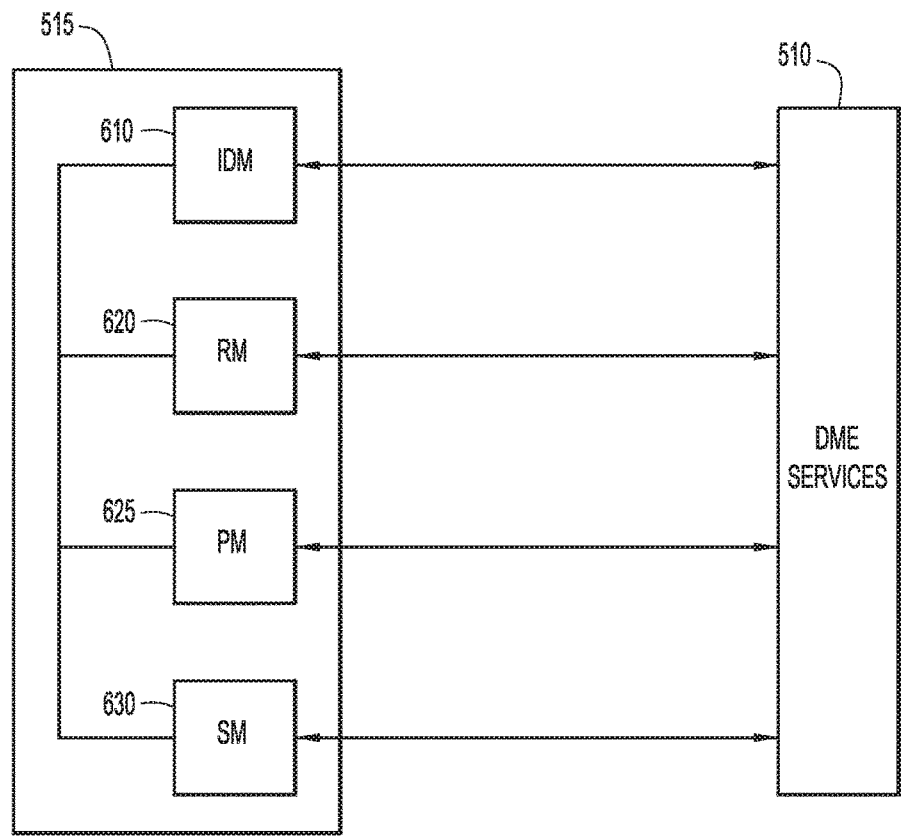
FIG. 6 is a block diagram of the functional components of a global management module configured to provide logical workload deployment across the domains of a datacenter, according to an example embodiment.

With reference now made to FIG. 6, depicted therein are the components of global management module 515. Specifically, global management module 515 is comprised of ID manager 610, resource manager 620, policy manager 625, and statistics manager 630. ID manager 610 may be responsible for determining, assigning, and tracking the assigned global identifiers. For example, ID manager 610 may be responsible for assigning an identifier from a global pool of identifiers to a global profile, tracking that the assigned identifier should not be assigned to another profile. ID manage 610 may also be responsible for determining when an identifier is no longer in use by a global profile, and therefore, when an identifier can once again be drawn form the global pool for assignment to another global profile.

Resource manager 620, on the other hand, may be responsible for determining the resources available at the servers registered in the global management module, determining which resources are consumed when a global profile is assigned to a server, and determining which resources are once again available when a global profile is no longer assigned to a server. Similarly, if the global management module utilizes global pools of resources, like server pools, resource manager 620 may selected a specific server from a server pool for assignment of a global profile.

The policy manager 625 may be responsible for generating the global pools of identifiers and determining the policies or workloads that should be carried out through a global profile. Accordingly, the policy manager 625 will work with the ID manager and the resource manager 620 to assign policies and identifiers to a global profile. Finally, the statistics manager 630 is used to gather statistics across domains, such as performance metrics, and report the statistics to a user.

Figure 7:
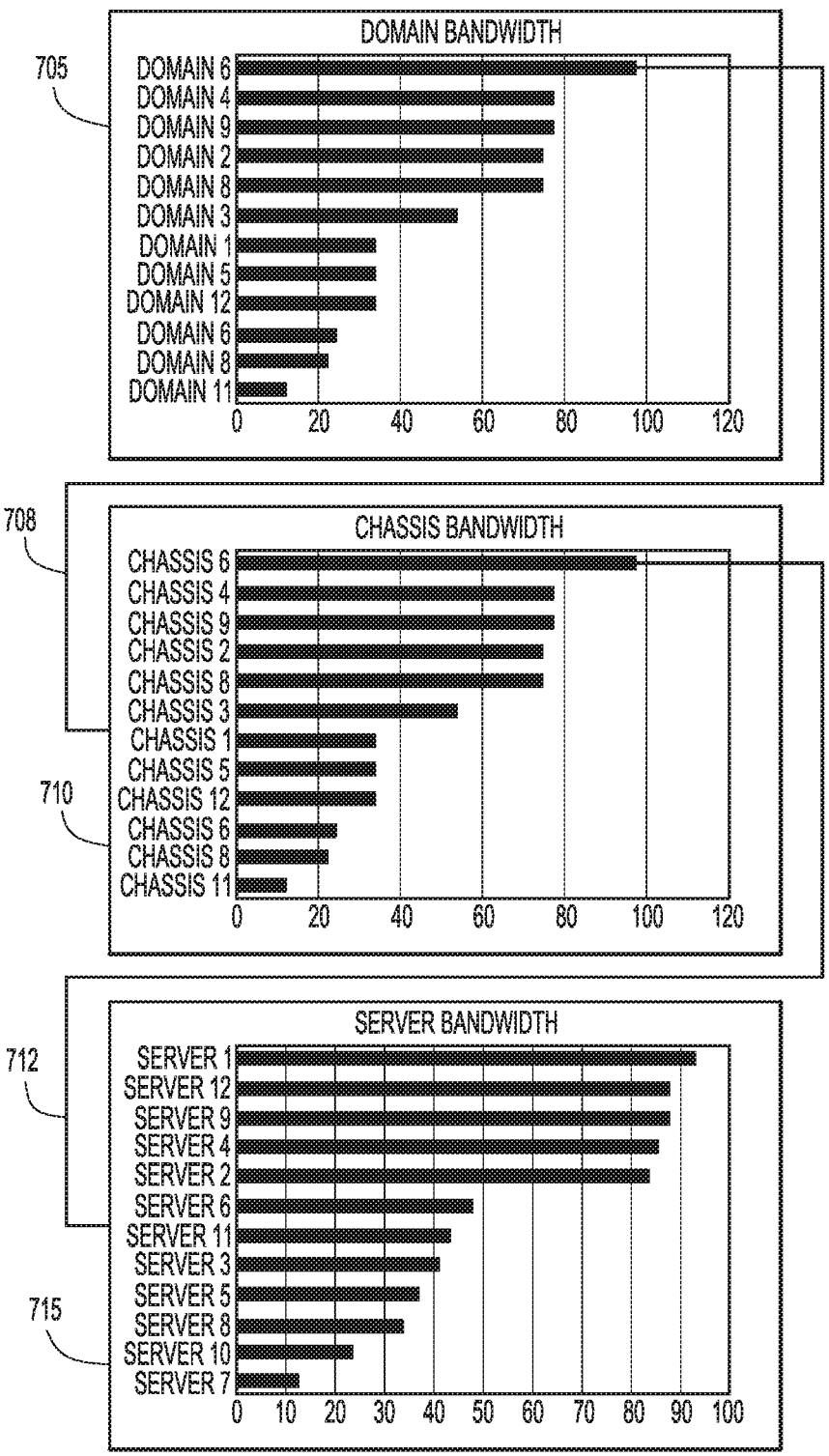
FIG. 7 is an illustration of cross-domain metrics reporting provided by a global management module configured to manage workloads across the domains of a datacenter, according to an example embodiment.

With reference now made to FIG. 7, depicted therein are some of the metrics and reporting that can be carried out by a global management module, for example global workload manager 105 as described in FIG. 1, utilizing a statistics manager, such as statistics manager 630 of FIG. 6. Specifically, because a global management module has cross-domain visibility, it may provide reporting on multiple domains without aggregating data from multiple domain managers and/or without requiring an administrator to transition between multiple management interfaces. Graph 705 illustrates bandwidth aggregated at the domain level and for multiple domains. A domain manager, like domain managers 155a-c of FIG. 1, would be unable to provide this level of reporting because each domain manager would lack visibility to the other domains.

Also illustrated in FIG. 7 is the ability to "drill down" from the domain level to the chassis level, as schematically illustrated by 708. Specifically, an administrator may choose a specific domain from graph 705 and "drill down" to see the bandwidth for the chassis that make up the selected domain in the form of graph 710. Further "drilling down" is schematically illustrated by 712 which represents a selection of a single chassis, allowing an administrator to view the bandwidth for individual servers in the form of graph 715. It would also be possible to generate a report showing statistics for all chassis and/or all servers within a datacenter given the cross domain visibility that a global management module provides.

Figure 8:
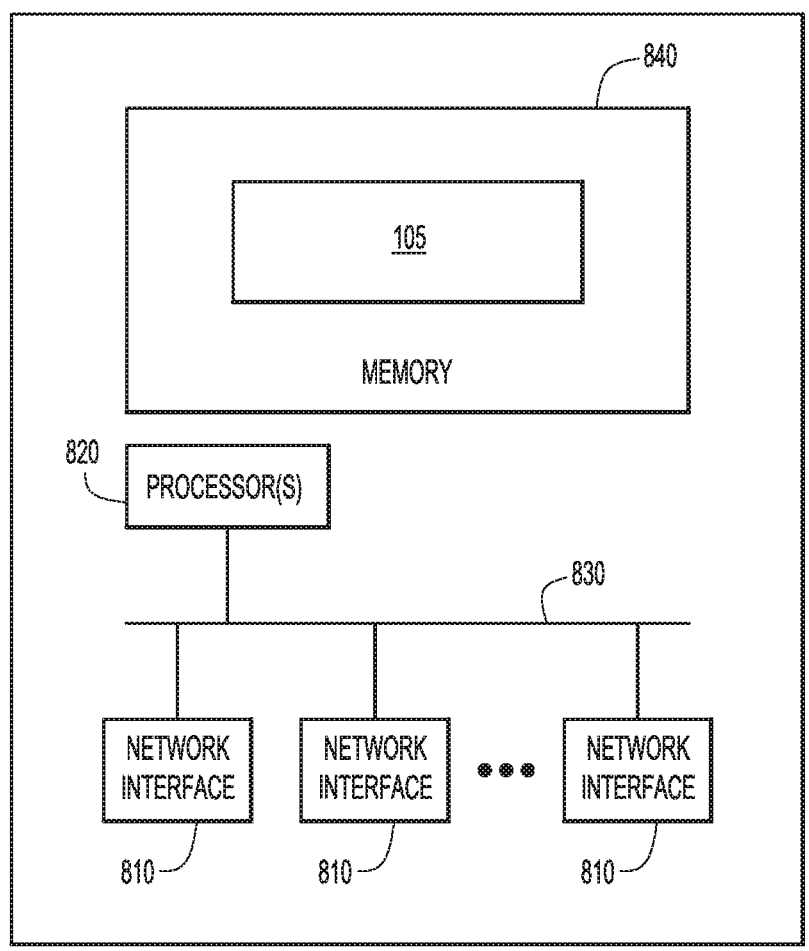
FIG. 8 is a block diagram illustrating a device configured to provide logical workload deployment across domains, according to an example embodiment.

With reference now made to FIG. 8, an example block diagram is shown of a device, such as a virtual machine appliance 505 of FIG. 5, configured to perform the techniques described herein. Virtual machine appliance 505 comprises network interfaces (ports) 810 which may be used to connect virtual machine appliance 505 to a network. One or more processors 820 are provided to coordinate and control virtual machine appliance 505. The processor 820 is, for example, one or more microprocessors or microcontrollers, and it communicates with the network interface 810 via bus 830. Memory 840 comprises software instructions that may be executed by the processor 820. For example, software instructions for virtual machine appliance 505 include instructions for the components of a global management module 505, like those described in reference to FIGS. 5 and 6. In other words, memory 840 includes instructions for virtual machine appliance 505 to carry out the operations described above in connection with FIGS. 1-7.

Memory 840 may comprise read only memory (ROM), random access memory (RAM), magnetic disk storage media devices, optical storage media devices, flash memory devices, electrical, optical or other physical/tangible (e.g. non-transitory) memory storage devices. Thus, in general, the memory 840 may comprise one or more tangible (non-transitory) computer readable storage media (e.g., a memory device) encoded with software comprising computer executable instructions. When the software, e.g., global management module software 105 is executed (by the processor 820), the processor is operable to perform the operations described herein in connection with FIGS. 1-7. While the above description refers to virtual machine appliance 505, processor 820, memory 840 with software 105, bus 830, and network interfaces 810 may also be embodied in other devices.

To summarize, a method is provided comprising: registering at least two domains, each domain comprising at least one server; generating a global pool of identifiers; generating a logical configuration in the form of a global profile, the global profile being configured to allow a workload at one or more of the servers to be processed; associating an identifier from the global pool of identifiers with the global profile, and assigning the global profile to a server in a first domain of the at least two domains.

In another form, an apparatus is provided comprising a network interface unit configured to enable communication over a network; and a processor coupled to the network interface unit to: register at least two domains, each domain comprising at least one server; generate a global pool of identifiers; generate a logical configuration in the form of a global profile, the global profile being configured to allow a workload at one or more of the servers to be processed; associate a global identifier with the global profile; and assign the global profile to a server in a first of the at least two domains.

In still a further form, one or more computer readable storage media are provided encoded with software comprising computer executable instructions and when the software is executed operable to: register at least two domains, each domain comprising at least one server; generate a global pool of identifiers; generate a logical configuration in the form of a global profile, the global profile being configured to allow a workload at one or more of the servers to be processed; associate a global identifier with the global profile; and assign the global profile to a server of a first of the at least two domains.

The above description is intended by way of example only. Various modifications and structural changes may be made therein without departing from the scope of the concepts described herein and within the scope and range of equivalents of the claims.

What is claimed is:

1. A method comprising:
registering a plurality of servers, wherein one of the plurality of servers communicates via a first fabric interconnect and another of the plurality of servers communicates via a second fabric interconnect;
generating a global pool of server identifiers to uniquely identify servers that communicate via either of the first fabric interconnect or the second fabric interconnect;
generating a global profile configured to allow a workload at one or more of the plurality of servers to be processed;
associating a server identifier from the global pool of server identifiers with the global profile; and
assigning the global profile to the server that communicates via the first fabric interconnect.

2. The method of claim 1, further comprising migrating services assigned to the server that communicates via the first fabric interconnect to the server that communicates via the second fabric interconnect.

3. The method of claim 2, wherein migrating the services assigned to the server that communicates via the first fabric interconnect comprises reassigning the global profile from the server that communicates via the first fabric interconnect to the server that communicates via the second fabric interconnect.

4. The method claim 1, wherein generating the global pool of server identifiers comprises generating a global pool of media access control (MAC) addresses.

5. The method of claim 1, wherein generating the global profile comprises generating a global template and assigning identifiers from the global pool of server identifiers to the global template.

6. The method of claim 1, further comprising generating a global pool of resources.

7. The method of claim 6, wherein generating the global pool of resources comprises generating a global pool of servers.

8. The method of claim 7, wherein assigning the global profile comprises assigning the global profile to the global pool of servers.

9. An apparatus comprising:
a network interface unit configured to enable communication over a network; and
a processor coupled to the network interface unit and configured to:
register a plurality of servers, wherein one of the plurality of servers communicates via a first fabric interconnect and another of the plurality of servers communicates via a second fabric interconnect;
generate a global pool of server identifiers to uniquely identify servers that communicate via either of the first fabric interconnect or the second fabric interconnect;
generate a global profile configured to allow a workload at one or more of the plurality of servers to be processed;
associate a server identifier from the global pool of server identifiers with the global profile; and
assign the global profile to the server that communicates via the first fabric interconnect.

10. The apparatus of claim 9, wherein the processor is configured to migrate services assigned to the server that communicates via the first fabric interconnect to the server that communicates via the second fabric interconnect.

11. The apparatus of claim 10, wherein the processor is configured to migrate the services assigned to the server that communicates via the first fabric interconnect by reassigning the global profile from the server that communicates via the first fabric interconnect to the server that communicates via the second fabric interconnect.

12. The apparatus of claim 9, wherein the processor is configured to generate the global pool of server identifiers by generating a global pool of media access control (MAC) addresses.

13. The apparatus of claim 9, wherein the processor is configured to generate a global template and assign identifiers from the global pool of server identifiers to the global template.

14. The apparatus of claim 9, wherein the processor is further configured to:
generate a global pool of servers, and
assign the global profile to the server that communicates via the first fabric interconnect by assigning the global profile to the global pool of servers.

15. One or more non-transitory computer readable storage media encoded with software comprising computer executable instructions and when the software is executed operable to:
register a plurality of servers, wherein one of the plurality of servers communicates via a first fabric interconnect and another of the plurality of servers communicates via a second fabric interconnect;
generate a global pool of server identifiers to uniquely identify servers that communicate via either of the first fabric interconnect or the second fabric interconnect;
generate a global profile configured to allow a workload at one or more of the plurality of servers to be processed;
associate a server identifier from the global pool of server identifiers with the global profile; and
assign the global profile to the server that communicates via the first fabric interconnect.

16. The non-transitory computer readable storage media of claim 15, further comprising instructions operable to migrate services assigned to the server that communicates via the first fabric interconnect to the server that communicates via the second fabric interconnect.

17. The non-transitory computer readable storage media of claim 16, wherein the instructions operable to migrate the services assigned to the server that communicates via the first fabric interconnect comprise instructions operable to reassign the global profile from the server that communicates via the first fabric interconnect to the server that communicates via the second fabric interconnect.

18. The non-transitory computer readable storage media of claim 15, wherein the instructions operable to generate the global pool of server identifiers comprise instructions operable to generate a global pool of media access control (MAC) addresses.

19. The non-transitory computer readable storage media of claim 15, further comprising instructions operable to generate a global template and assign identifiers from the global pool of server identifiers to the global template.

20. The non-transitory computer readable storage media of claim 15, further comprising instructions operable to:
generate a global pool of servers, and assign the global profile to the server that communicates via the first fabric interconnect by assigning the global profile to the global pool of servers.

\* \* \* \* \*